May 24, 1960 E. BERANEK 2,937,477
MANUFACTURE OF DECORATIVE GLASS ARTICLES
Filed Oct. 3, 1956
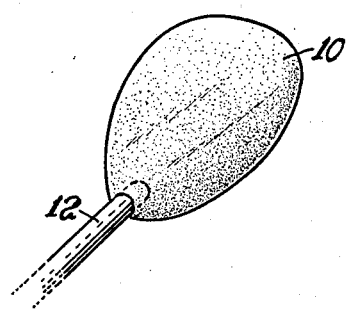
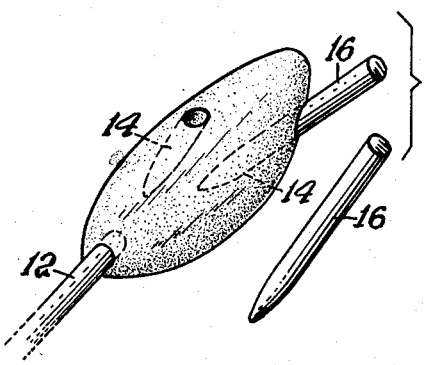
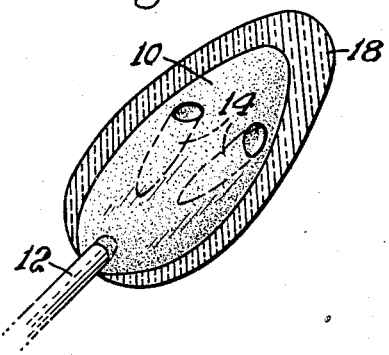
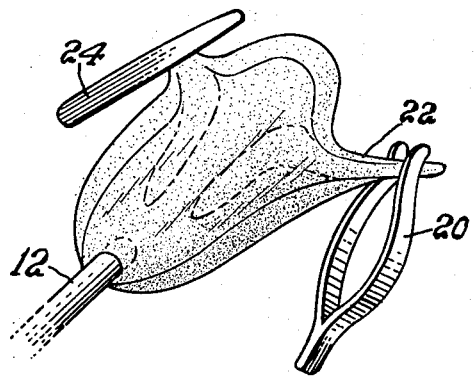
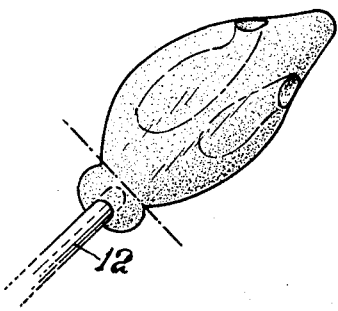
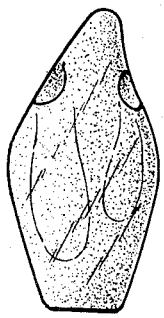
INVENTOR.
Emanuel Beránek
BY

United States Patent Office 2,937,477
Patented May 24, 1960

2,937,477
MANUFACTURE OF DECORATIVE GLASS ARTICLES

Emanuel Beranek, Skrdlovice, Czechoslovakia, assignor to Druzstevni prace Ustredni druzstvo umeleckych remesel, vytvarni oddeleni, Prague, Czechoslovakia Filed Oct. 3, 1956, Ser. No. 613,792

2 Claims. (Cl. 49—85)

The present invention relates to the manufacture of decorative glass articles. More particularly, my invention aims at the manufacture of glass articles which consist of a body of glass, that is provided with at least a single cavity having substantially the shape of an elongated drop of liquid. The cavity or cavities extend from any place of the outer face of the glass body toward the interior of the body to terminate within the body.

Decorative glass articles have hitherto been manufactured by various techniques, mostly by blowing in a mold. In this known way decorative glass articles from one piece of glass provided with several apertures cannot, however, be produced.

The method according to the invention allows the manufacture of this new kind of product without a mold, which insures absolute clarity of the glass and a perfectly smooth and highly brilliant surface of the product without any subsequent polishing.

The articles produced in this way may be colored, preferably while still in hot condition, by inserting a colored powder, if required in different colors, into the various cavities of the article.

The objects, features and advantages of the invention will be apparent from the following general description and the detailed description of an illustrative embodiment of the invention, which is to be read in connection with the accompanying drawing.

A certain amount of glass, depending on the desired size of the product, is taken up with an iron bar or punty. Into this core, for instance, of a future vase, recesses or cavities are impressed with a metal tool of a suitable, preferably bottle-shaped end portion. By swinging the glass mass, the said recesses in the glowing glass are extended to the shape of longitudinal tear drops. After having been cooled down, the semi-product prepared in this way is covered with a further layer of glass by which the cavities, produced before, are closed. Under incessant swinging, the glass is drawn out in the direction away from the punty until the apex of the glass-enclosed air bubble penetrates to the surface of the semiproduct. With the use of suitable tools the edges of the holes are in a known way given their final shape. Superfluous glass on the apices of the cavities is cut off or broken off and the finished product severed from the punty. It is self evident, that the product may receive the most varied shapes or that any desired numbers of apertures may be chosen.

In the drawing, Fig. 1 shows a mass of molten glass gathered on the end of a bar or punty;

Fig. 2 is explanatory of the step of making recesses or cavities in the mass of glass;

Fig. 3 illustrates the body of glass of Fig. 2, covered with a new layer of glass;

Fig. 4 is explanatory of the action of tools to open the cavities and to give the edges of cavities which have opened to the surface of the glass product the desired shape;

Fig. 5 shows the finished article except for its being still connected to the punty; and Fig. 6 shows a vaselike completely finished article.

Referring to the drawing in detail, and initially to Fig. 1, a portion of glass, designated 10, is withdrawn from molten glass with the aid of a bar or punty 12, for instance, of iron, and stays connected to an end of the punty. As shown in Fig. 2, two indentations or cavities 14 are impressed into the mass of glass by means of a brass pin 16. It will be seen that the body of glass shown in Fig. 2 is longer than the original body of glass shown in Fig. 1. Such lengthening is due to the mass of glass, as shown in Fig. 1, having been swung.

The indented mass of glass of Fig. 2 is coated with a layer of glass 18 (see Fig. 3) without filling the cavities, and another swinging step lengthens the glass further. A tool 20 is used (see Fig. 4) to draw out the glass at 22 to lengthen the respective cavity and to allow same to be broken open. A tool 24 is then used to give the edges of the open cavities the desired final shape.

Fig. 5 shows the finished article while still connected to the punty 12. Upon cutting the body of glass off the punty, a vaselike completely finished article, as shown in Fig. 6, is obtained.

The finished product is characterized by absolute clarity of the glass with high brilliancy of its surface as well as clear surface lines which have not been impaired by the contact of the still plastic glass with a mold.

A further aesthetically highly pleasing effect is achieved by inserting a colored powder into the cavities of the produced article. This is carried out in such a way that finely spread glass powder is taken up on a glass rod having a thickened end portion, the rod is inserted into the cavities of the product as long as the glass cavities in the interior is still glowing hot, and the powder is spread over the entire inner surface of the cavities. When for each cavity a powder of another color or shade is chosen, the aesthetic effect is still enhanced.

It will be understood that the number and shape of the cavities may be varied.

I claim:

1. Method of manufacturing decorative glass articles, comprising withdrawing from molten glass a portion thereof by means of a metallic rod, impressing with the aid of a tool at least a single cavity into the withdrawn portion or mass to extend from the outer face of the mass toward, and to terminate within, the interior thereof, withdrawing the tool, swinging the mass to lengthen same and the cavity, coating the mass with a layer of glass, thereby covering the cavity without filling same, and further swinging the body of glass thus obtained, thereby further lengthening the glass body, and lengthening and opening the cavity by means of other tools.

2. In the method according to claim 1, spreading colored glass powder, after opening the cavity at its outer end, over the inner surface of the cavity, while the interior of the glass mass is still glowing hot.

References Cited in the file of this patent

UNITED STATES PATENTS 389,595   Reder _____ Sept. 18, 1888

FOREIGN PATENTS 232,136   Germany _____ Mar. 9, 1911

OTHER REFERENCES

"Glass the Miracle Maker," Phillips, published by Pitman Publishing Corp., N.Y. 1941, pages 156–164.